(12) United States Patent
Tran et al.

(10) Patent No.: US 12,474,836 B2
(45) Date of Patent: Nov. 18, 2025

(54) MEMORY SYSTEM AND METHOD

(71) Applicant: Kioxia Corporation, Tokyo (JP)

(72) Inventors: Aurelien Nam Phong Tran, Kanagawa (JP); Shinji Yonezawa, Kanagawa (JP); Yuki Sasaki, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/817,370

(22) Filed: Aug. 28, 2024

(65) Prior Publication Data

US 2025/0284399 A1 Sep. 11, 2025

(30) Foreign Application Priority Data

Mar. 6, 2024 (JP) ................. 2024-033996

(51) Int. Cl.
*G06F 3/06* (2006.01)
(52) U.S. Cl.
CPC .......... *G06F 3/0611* (2013.01); *G06F 3/0659* (2013.01); *G06F 3/0679* (2013.01)
(58) Field of Classification Search
CPC ....................................................... G06F 3/06
See application file for complete search history.

(56) References Cited

U.S. PATENT DOCUMENTS

| | | | |
|---|---|---|---|
| 2010/0235715 A1 | 9/2010 | Thatcher et al. | |
| 2012/0284587 A1 | 11/2012 | Yu et al. | |
| 2018/0188970 A1* | 7/2018 | Liu | G06F 3/0653 |
| 2020/0233769 A1* | 7/2020 | Koizumi | G11C 5/14 |
| 2022/0057966 A1* | 2/2022 | Kanno | G06F 3/0653 |
| 2023/0273881 A1 | 8/2023 | Miller et al. | |

\* cited by examiner

*Primary Examiner* — Khoa D Doan
(74) *Attorney, Agent, or Firm* — Maier & Maier, PLLC

(57) ABSTRACT

According to an embodiment, a memory system includes a nonvolatile memory and a memory controller. The nonvolatile memory includes storage areas. The memory controller counts a first number that is the number of uncompleted requests generated in a first time section for read operations to be executed on a first storage area. In a second time section subsequent to the first time section, the memory controller waits until the first number becomes zero without executing an erase operation on the first storage area while the first number is not zero, and executes the erase operation on the first storage area in response to the first number becoming zero.

20 Claims, 12 Drawing Sheets

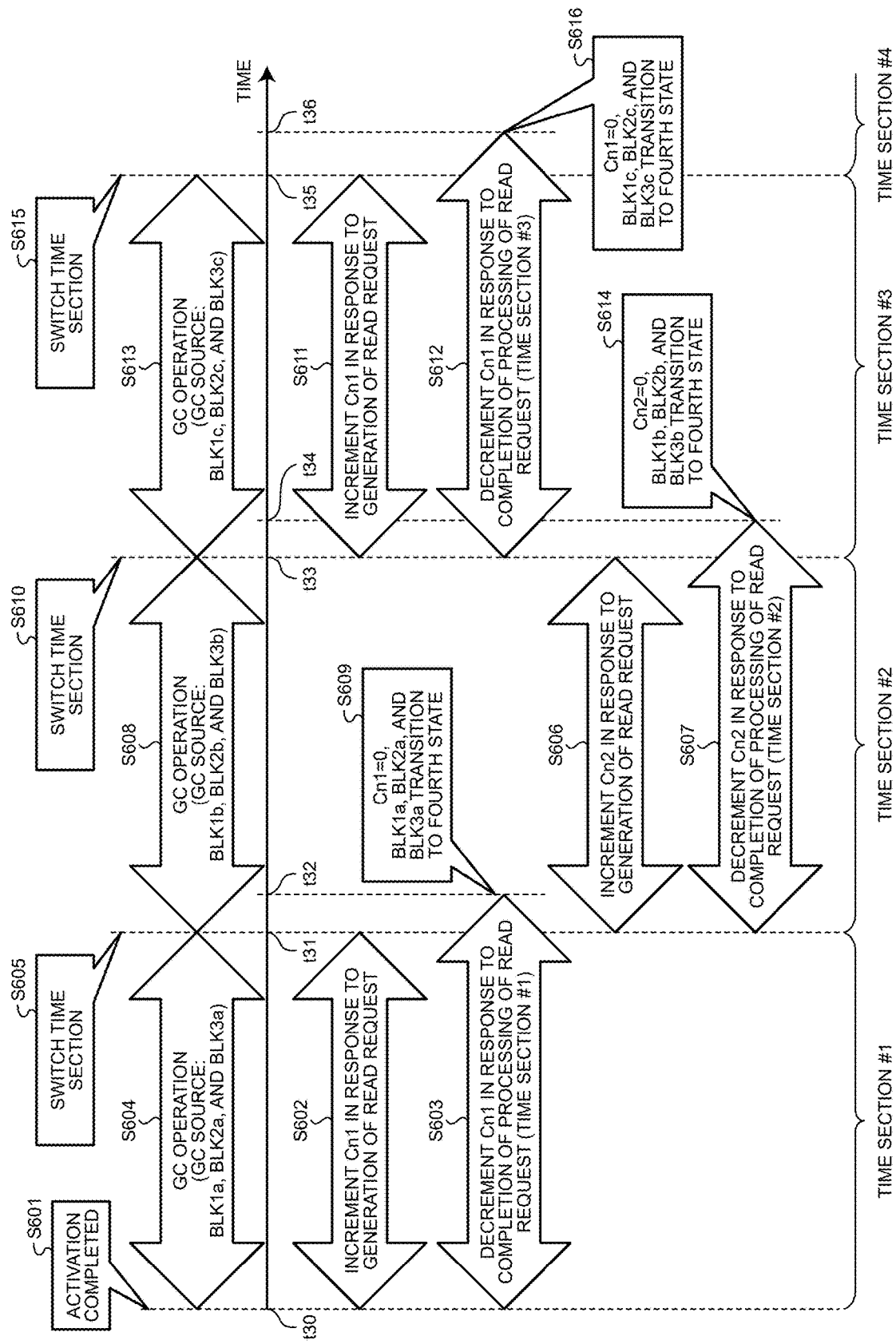

MEMORY SYSTEM AND METHOD

CROSS-REFERENCE TO RELATED APPLICATIONS

This application is based upon and claims the benefit of priority from Japanese Patent Application No. 2024-033996, filed on Mar. 6, 2024, the entire contents of which are incorporated herein by reference.

FIELD

Embodiments described herein relate generally to a memory system and a method.

BACKGROUND

In a conventionally known memory system including flash memory and a memory controller, the memory controller executes a garbage collection operation. The garbage collection operation is an operation of copying valid data from one of at least two blocks to the other block and bringing the copy source block into a state of storing no valid data. The memory controller executes an erase operation on the block that stores no valid data, thereby bringing the block to a state of enabling write of new data. The memory controller stores management information for managing the state of each block as described above in a volatile memory, and updates or refers to the management information in the volatile memory.

BRIEF DESCRIPTION OF THE DRAWINGS

FIG. 13 is a diagram for illustrating a specific example of an operation of a block management unit according to a second embodiment.

DETAILED DESCRIPTION

In general, according to some embodiments, a memory system includes a nonvolatile memory and a memory controller. The nonvolatile memory includes a plurality of storage areas each being a unit of an erase operation. The memory controller is configured to count a first number being the number of uncompleted requests generated in a first time section for read operations to be executed on one or more first storage areas of the plurality of storage areas. The memory controller is configured to count a second number being the number of uncompleted requests generated in a second time section subsequent to the first time section for read operations to be executed on one or more second storage areas of the plurality of storage areas. The memory controller is configured to, in the second time section, wait until the first number becomes zero without executing the erase operation on any of the first storage areas while the first number is not zero, and execute the erase operation on at least one of the first storage areas in response to the first number becoming zero.

Hereinafter, a memory system and a method according to embodiments will be described in detail with reference to the accompanying drawings. Note that the present invention is not limited by these embodiments.

First Embodiment

Figure 1:
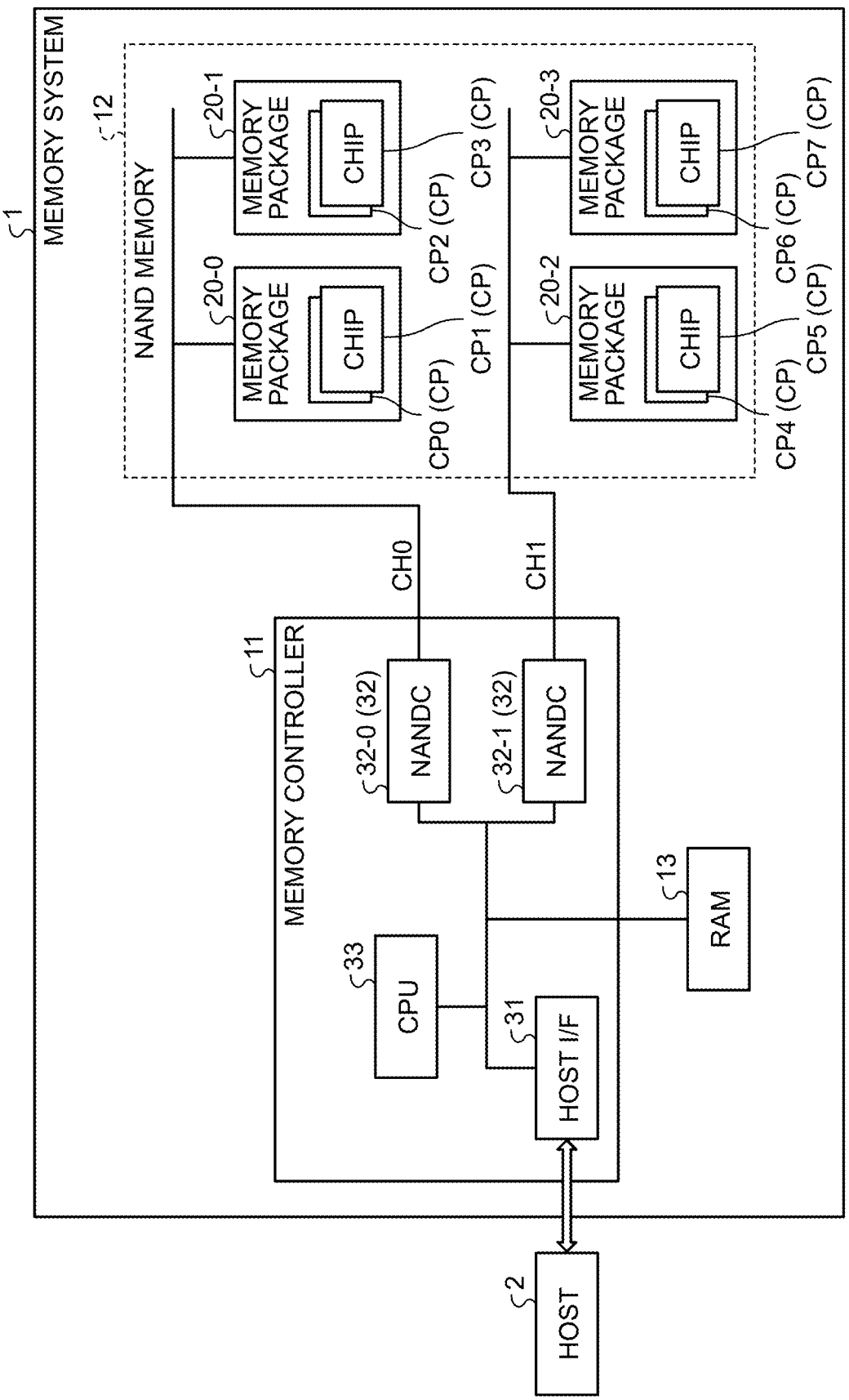
FIG. 1 is a schematic diagram illustrating an example of a configuration of a memory system according to a first embodiment.

FIG. 1 is a schematic diagram illustrating an example of a configuration of a memory system according to a first embodiment.

As illustrated in FIG. 1, a memory system 1 can be connected to a host 2 via a predetermined communication interface. Examples of the host 2 include a processor, a personal computer, a portable information terminal, and a server. The memory system 1 receives various access commands from the host 2. The various access commands include a write command, a read command, or the like.

The access command includes a logical address. The memory system 1 provides a logical address space to the host 2. The logical address represents address information indicating a location in the logical address space. The host 2 uses the logical address to designate a location where user data is written or a location where user data is read. The logical address is location information indicating an access destination.

The memory system 1 includes a memory controller 11, NAND flash memory 12, and random access memory (RAM) 13. Hereinafter, the flash memory 12 is denoted as the NAND memory 12.

The NAND memory 12 is a nonvolatile memory that functions as storage. The NAND memory 12 includes one or more memory chips CP. Here, the one or more memory chips CP are represented by eight memory chips CP0 to CP7 illustrated as an example. Some of the memory chips CP may be sealed with a resin or the like to form one package. Here, an illustrated example includes: a memory package 20-0 including the memory chips CP0 and CP1; a memory package 20-1 including the memory chips CP2 and CP3; a memory package 20-2 including the memory chips CP4 and CP5; and a memory package 20-3 including the memory chips CP6 and CP7.

The memory controller 11 and the NAND memory 12 are connected via one or more channels. Here, as an example, the memory system 1 includes two channels CH0 and CH1. The two channels CH0 and CH1 are connected to the memory controller 11. The memory packages 20-0 and 20-1 are connected to the channel CH0, while the memory packages 20-2 and 20-3 are connected to the channel CH1.

Note that the number of channels, the number of memory chips CP, the number of memory packages 20, and the wiring between the memory controller 11 and each of the memory chips CP included in the memory system 1 are not limited to these examples.

The memory controller 11 may be implemented as a system-on-a-chip (SoC). Alternatively, the memory controller 11 may be configured by a plurality of chips. The memory controller 11 may also be implemented, partially or entirely, as a field-programmable gate array (FPGA) or an application specific integrated circuit (ASIC).

The memory controller 11 executes various types of processing including data transfer between the host 2 and the NAND memory 12. As a configuration for this purpose, the memory controller 11 includes a host interface (I/F) 31, one or more NAND controllers (NANDC(s)) 32, and a central processing unit (CPU) 33.

The host I/F 31 controls transfer of information such as commands and data with the host 2.

The CPU 33 implements entire control of the memory controller 11 based on a firmware program.

Based on a request from the CPU 33, the NANDC 32 transfers a command for accessing the NAND memory 12 via a channel to a target memory chip CP or transfers data corresponding to the command to the NAND memory 12. The access to the NAND memory 12 includes data write, data read, and data erase.

In the example illustrated in FIG. 1, the memory controller 11 includes two NANDCs 32-0 and 32-1 as an example of one or more NANDC(s) 32. The NANDC 32-0 controls transfer of commands and data via the channel CH0. The NANDC 32-1 controls the transfer of commands and data via the channel CH1. The number of NANDCs 32 included in the memory controller 11 is not limited to two.

The RAM 13 is a volatile memory that provides an area as a buffer or a cache to the memory controller 11. For example, the memory controller 11 can use the RAM 13 as a buffer for data to be transferred between the host 2 and the NAND memory 12 or as an area for temporarily storing various types of management information.

In the example illustrated in FIG. 1, the RAM 13 is disposed outside the memory controller 11. The RAM 13 may be built in the memory controller 11. The type, number, and arrangement location of the RAM 13 included in the memory system 1 may be optionally determined. For example, the RAM 13 may be a dynamic random access memory (DRAM), a static random access memory (SRAM), or a combination of these types of memory. In a case where the RAM 13 is a combination of DRAM and SRAM, the SRAM may be built in the memory controller 11, and the DRAM may be disposed outside the memory controller 11.

Figure 2:
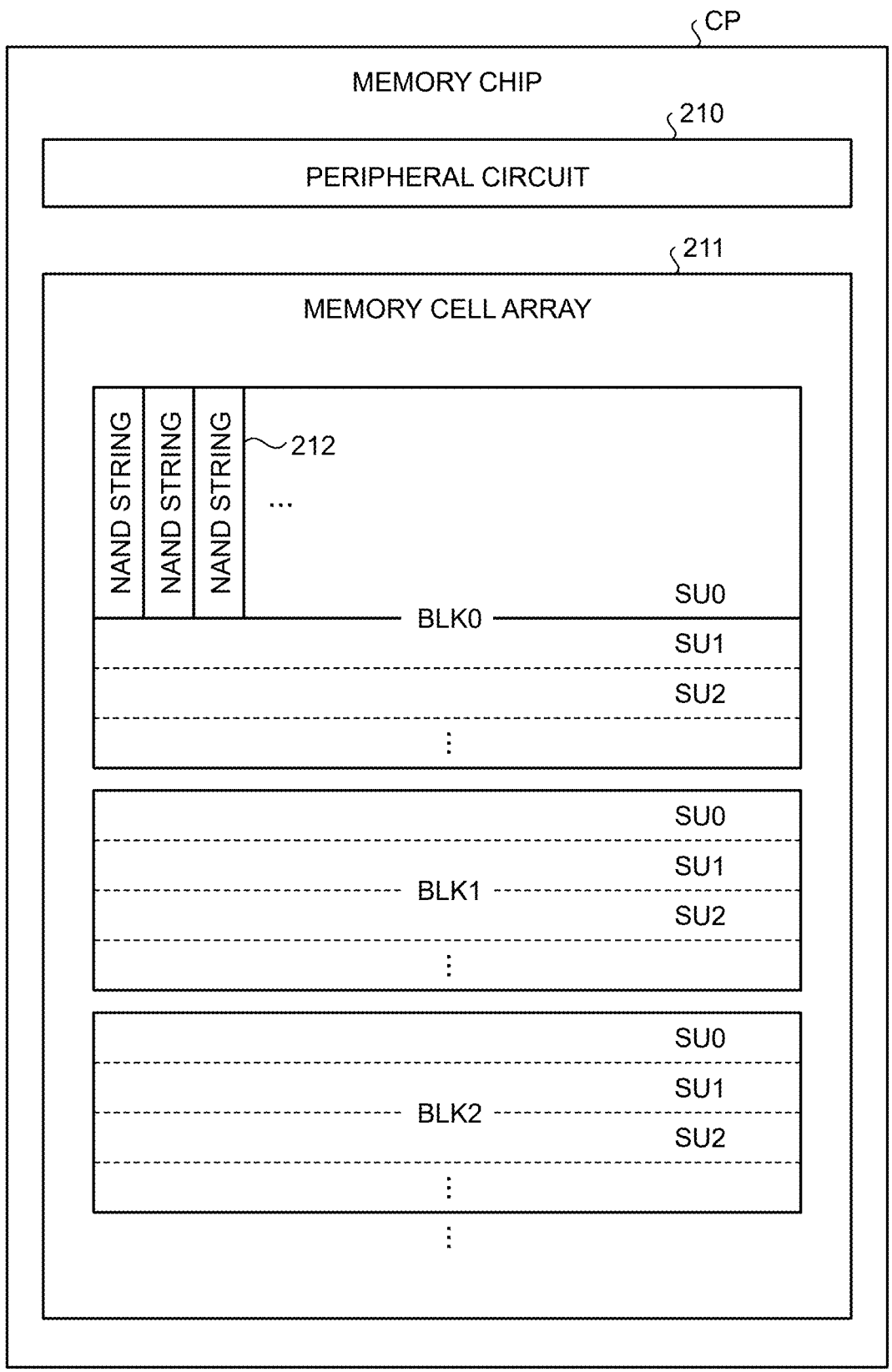
FIG. 2 is a schematic diagram illustrating an example of a configuration of a memory chip according to the first embodiment.

FIG. 2 is a schematic diagram illustrating an example of a configuration of the memory chip CP according to the first embodiment. The memory chip CP includes a peripheral circuit 210 and a memory cell array 211.

The memory cell array 211 includes a plurality of blocks BLK (BLK0, BLK1, BLK2, . . . ). Each block BLK includes a plurality of string units SU (SU0, SU1, SU2, . . . ). Each string unit SU includes a plurality of NAND strings 212. Each NAND string 212 includes a plurality of nonvolatile memory cell transistors connected in series. Note that the number of NAND strings 212 in the string unit SU may be optionally determined. The number of memory cell transistors in the NAND string 212 may be optionally determined.

The peripheral circuit 210 includes, for example, a row decoder, a column decoder, a sense amplifier, a latch circuit, and a voltage generation circuit. Upon receiving a command from the memory controller 11, the peripheral circuit 210 executes an operation in accordance with the received command.

The peripheral circuit 210 can execute a data-in operation, a program operation, a sense operation, a data-out operation, an erase operation, and the like in response to the received command. The data-in operation is an operation of taking write data, which is input from the memory controller 11 to the memory chip CP, into a latch circuit included in the peripheral circuit 210. The program operation is an operation of writing the data taken into the latch circuit by the data-in operation to the memory cell array 211. The sense operation is an operation of transferring data stored in the memory cell array 211 to the latch circuit included in the peripheral circuit 210. The data-out operation is an operation of outputting data stored in the latch circuit to the memory controller 11. The erase operation is an operation of erasing data stored in the memory cell array 211.

In the write operation, the memory controller 11 causes the peripheral circuit 210 to take write data into the latch circuit by the data-in operation. Thereafter, the memory controller 11 causes the peripheral circuit 210 to store the write data in the memory cell array 211 by the program operation.

In the read operation, the memory controller 11 causes the peripheral circuit 210 to transfer data stored in the memory cell array 211 to the latch circuit by the sense operation. Thereafter, the memory controller 11 causes the peripheral circuit 210 to output the data stored in the latch circuit to the memory controller 11 by the data-out operation. When the data to be read is already stored in the latch circuit, the sense operation may be omitted.

Figure 3:
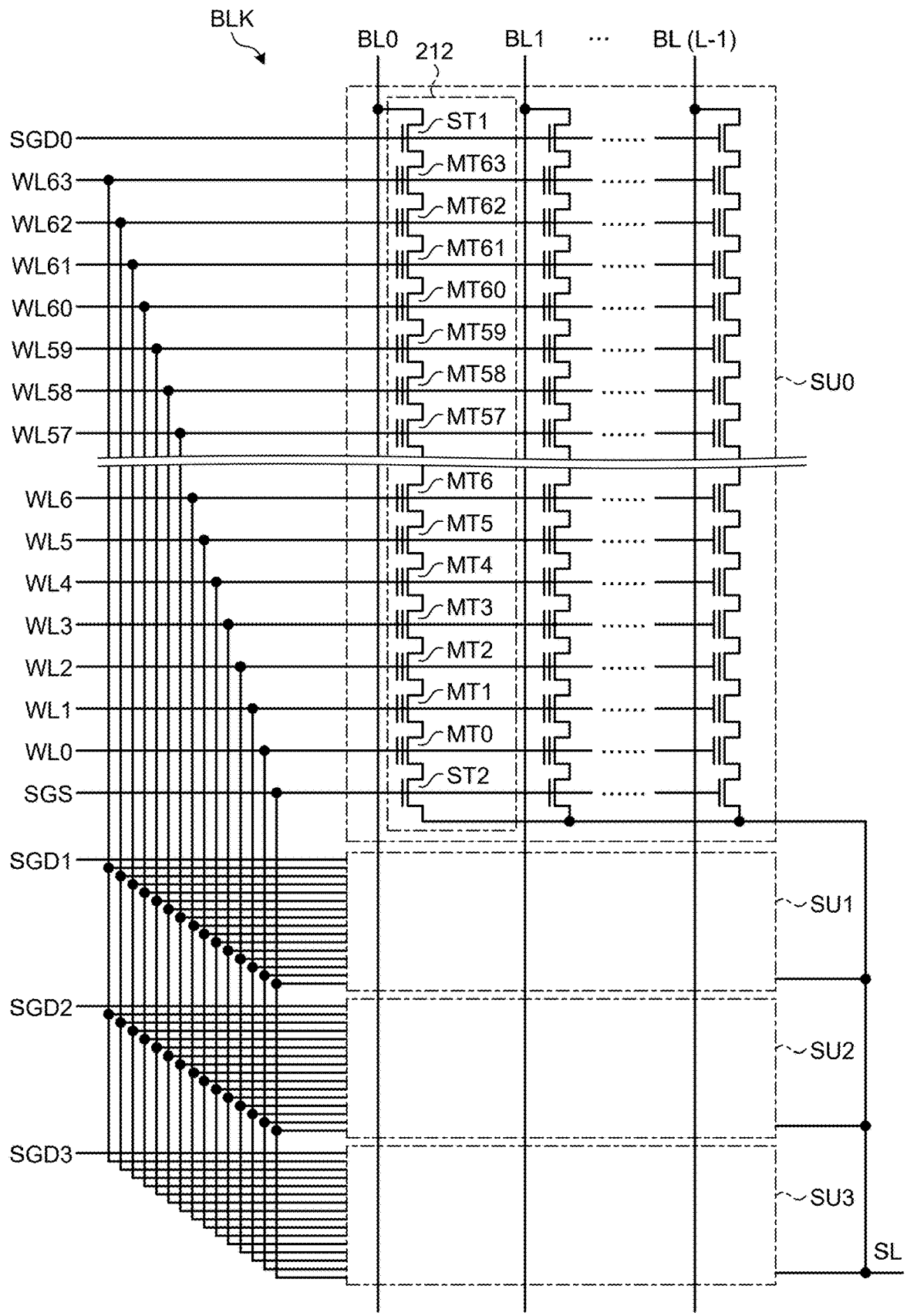
FIG. 3 is a schematic diagram illustrating an example of a circuit configuration of a block according to the first embodiment.

FIG. 3 is a schematic diagram illustrating a circuit configuration of the block BLK according to the first embodiment. Note that individual blocks BLK have an identical configuration. The block BLK includes four string units SU0 to SU3, for example. Each string unit SU includes a plurality of NAND strings 212.

Each NAND string 212 includes, for example, 64 memory cell transistors MT (MT0 to MT63) and select transistors ST1 and ST2. The memory cell transistor MT includes a control gate and a charge storage layer, and stores data in a nonvolatile manner. The 64 memory cell transistors MT (MT0 to MT63) are connected in series between the source of the select transistor ST1 and the drain of the select transistor ST2. The memory cell transistor MT may be a metal-oxide-nitride-oxide-silicon (MONOS) transistor in which an insulating film is used for the charge storage layer, or may be a floating gate (FG) transistor in which a conductive film is used for the charge storage layer. The number of memory cell transistors MT within the NAND string 212 is not limited to 64.

The gates of the select transistors ST1 in the string units SU0 to SU3 are each connected to select gate lines SGD0 to SGD3, respectively. On the other hand, the gates of the select transistors ST2 in individual string units SU0 to SU3 are commonly connected to a select gate SGS, for example.

The gates of the select transistors ST2 included in the string units SU0 to SU3 may be connected to individual select gate lines SGS0 to SGS3 (not illustrated) different for each string unit SU. The control gates of the memory cell transistors MT0 to MT63 included in the same block BLK are commonly connected to word lines WL0 to WL63, respectively.

The drains of the select transistors ST1 of the NAND strings 212 included in the string unit SU are connected to different bit lines BL (BL0 to BL(L-1), where L is a natural number of 2 or larger). In addition, the bit line BL commonly connects one NAND string 212 included in each string unit SU among the blocks BLK. The source of each select transistor ST2 is commonly connected to the source line SL.

Thus, the string unit SU is a set of NAND strings 212 connected to different bit lines BL and connected to the same select gate line SGD. The block BLK is a set of string units SU sharing the word line WL. The memory cell array 211 is a set of blocks BLK sharing at least one bit line BL.

The program operation and the sense operation by the peripheral circuit 210 can be collectively executed on the memory cell transistors MT connected to one word line WL in one string unit SU.

The erase operation by the peripheral circuit 210 is executed in units of blocks BLK. Thus, all the data stored in one block BLK is erased collectively.

Each block BLK is an example of a storage area.

The configuration of the memory cell array 211 is not limited to the configuration illustrated in FIG. 2 or 3. For example, the memory cell array 211 may have a configuration in which the NAND strings 212 are two-dimensionally or three-dimensionally arranged.

Next, a state transition of the block BLK will be described.

Figure 4:
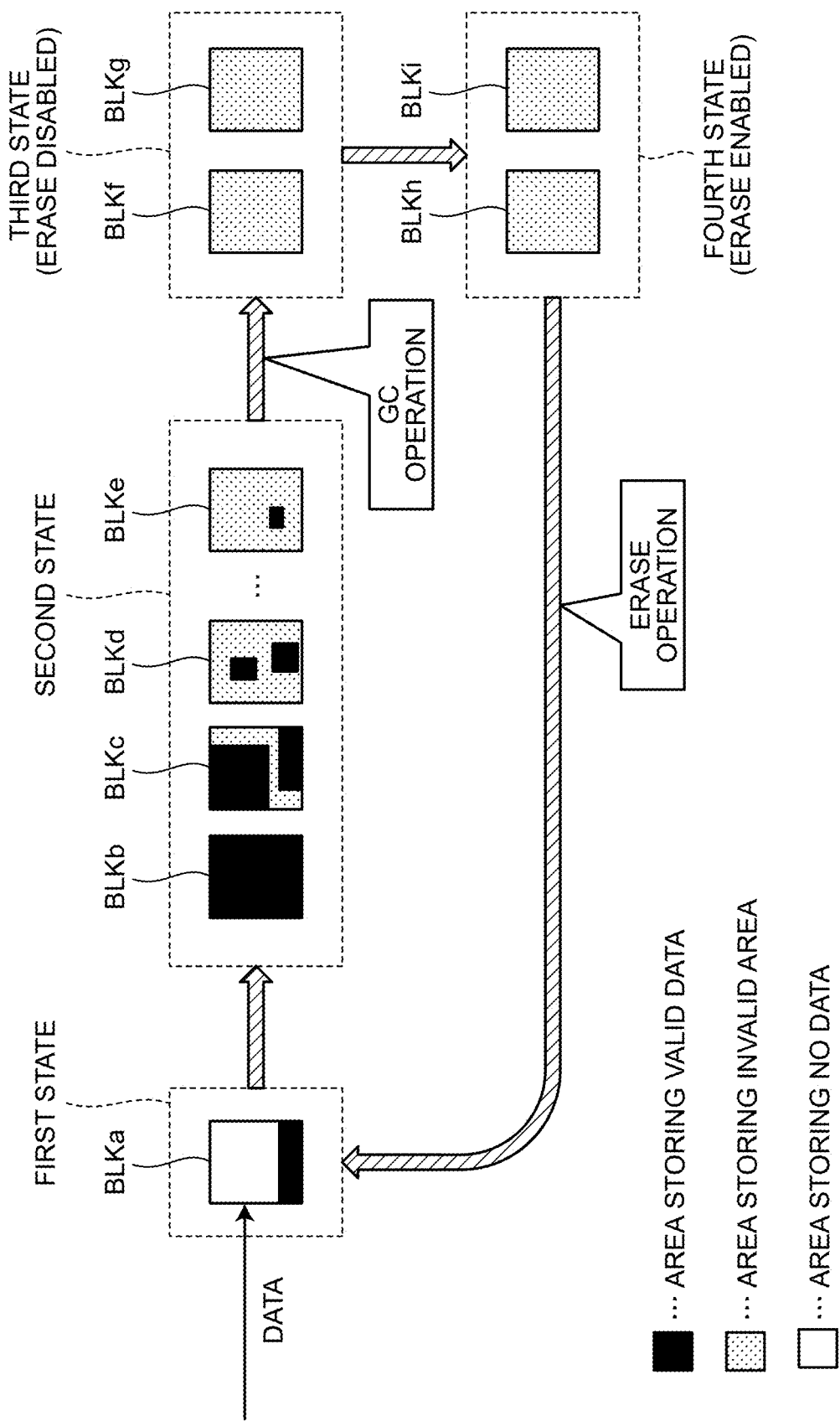
FIG. 4 is a schematic diagram for illustrating a state transition of the block according to the first embodiment.

FIG. 4 is a schematic diagram for illustrating the state transition of the block BLK according to the first embodiment.

Regarding the notation of each block BLK in FIG. 4, a solid-hatch portion indicates an area storing valid data. A dot-hatch portion indicates an area storing invalid data. An outlined portion indicates an area where data is not stored, namely, an area where data has been erased by the erase operation.

The block BLK can take one of a first state, a second state, a third state, or a fourth state.

The first state is a state set as a storage destination of new data. A block BLK in the first state (for example, a block BLKa) includes an area storing no data, and new data received from the memory controller 11 is stored in the area storing no data. The data stored in a block BLK in the first state is managed as valid data.

The second state is a state in which the storage of data is completed and new data is not to be stored. The second state is also a state of a block BLK not available for reuse yet. The reuse refers to transition of a block BLK to the first state.

For example, when data having a size corresponding to one block BLK is stored in a block BLK in the first state, the block BLK transitions from the first state to the second state. Here, the state of data stored in the block BLK in the second state is either a valid state or an invalid state. Hereinafter, data in a valid state is denoted as valid data, and data in an invalid state is denoted as invalid data.

In a state where data (denoted as first data) is stored in a block BLK (denoted as a first block BLK) in the second state, there is a case where second data, for which the same logical address value as that of the first data is designated, is sent from the host 2 to the memory system 1. More specifically, the value of the logical address designated for the second data is the same as the value of the logical address designated when the first data is sent to the memory system 1. In such a case, the memory controller 11 writes the second data in an area in which data is not stored, of a block BLK in the first state different from the first block BLK, and invalidates the first data stored in the first block BLK. Accordingly, for example, as illustrated in blocks BLKb to BLKe of FIG. 4, the data stored in each block BLK in the second state can include valid data and invalid data.

By executing a garbage collection operation (also denoted as a GC operation) by the memory controller 11 on a block BLK in the second state, all the data stored in the block BLK is invalidated, and the block BLK transitions from the second state to the third state.

The third state and the fourth state are states in which valid data is not stored as indicated by blocks BLKf to BLKi. Note that execution of the erase operation on a block BLK in the third state is disabled, and execution of the erase operation on a block BLK in the fourth state is enabled.

The memory controller 11 executes a read operation on the NAND memory 12 in response to a read command from the host 2. More specifically, when a read command is received from the host 2, the memory controller 11 determines a physical address indicating a read location in the NAND memory 12, based on a logical address included in the read command. The physical address is location information assigned to a combination of the memory chip CP, the block BLK, the word line WL, and the location in the word line WL. The memory controller 11 stores a read operation request including the determined physical address in a NAND access queue 42 to be described below. The memory controller 11 executes a read operation onto the NAND memory 12 in accordance with the request stored in the NAND access queue 42.

The read operation is executed in accordance with information stored in the NAND access queue 42. Therefore, there is a time lag between the timing at which a request of read operation is generated in response to a read command from the host 2 and the timing at which the requested read operation is actually executed. There is a case where the garbage collection operation for a block BLK (denoted as a second block BLK) in the second state is completed even though a read operation for the second block BLK is scheduled. In such a case, the erase operation for the second block BLK is disabled (in other words, prohibited) until the scheduled read operation for the second block BLK is completed.

The third state is a state of a block BLK for which it has not been confirmed that there is no uncompleted read operation. The fourth state is a state of a block BLK for which it has been confirmed that there is no uncompleted read operation.

When completion of all the scheduled read operations is confirmed with respect to a block BLK in the third state, the block BLK transitions from the third state to the fourth state.

When the erase operation is performed on a block BLK in the fourth state, the block BLK transitions from the fourth state to the first state.

Figure 5:
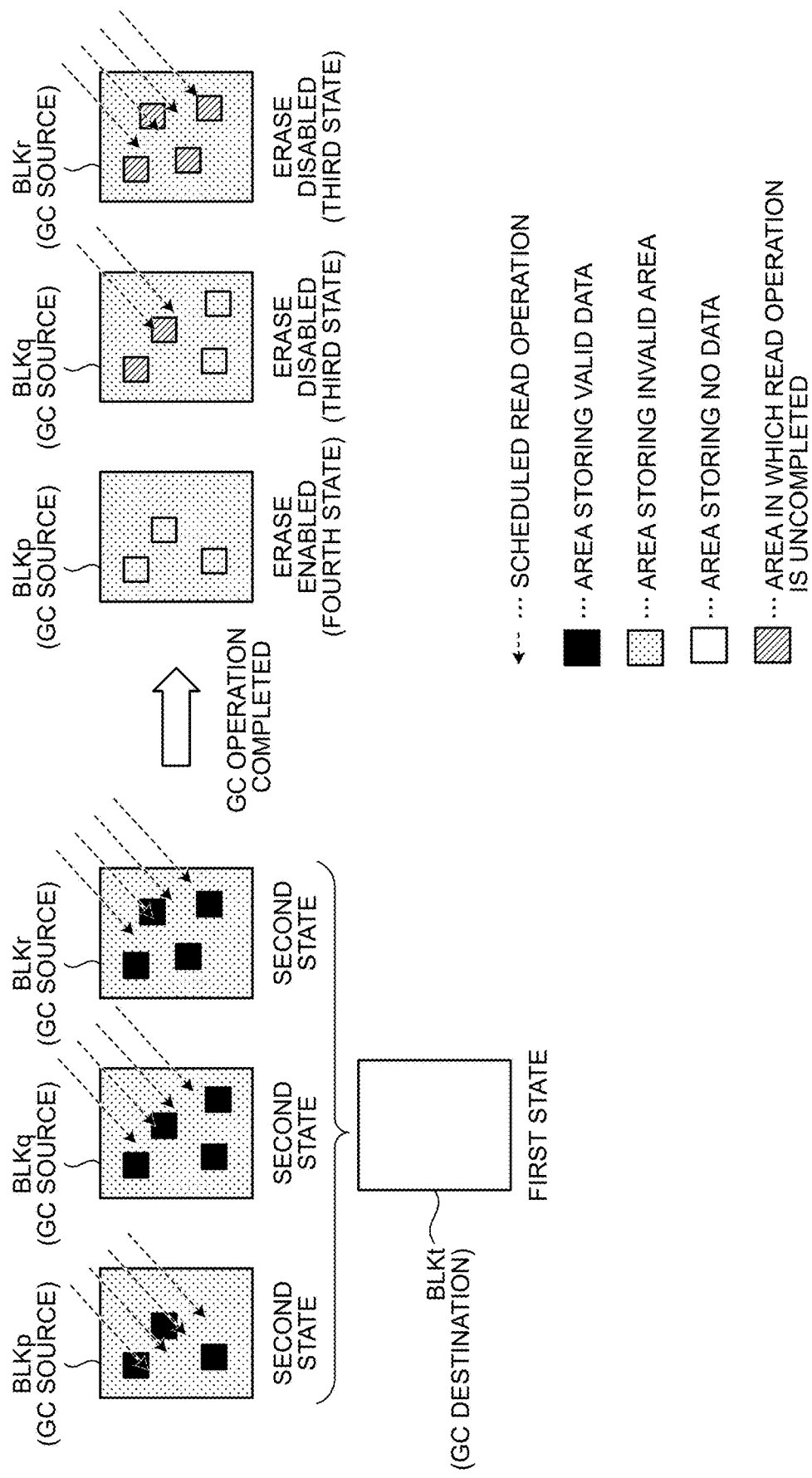
FIG. 5 is a schematic diagram for illustrating a garbage collection operation, a third state, and a fourth state according to the first embodiment.
Figure 6:
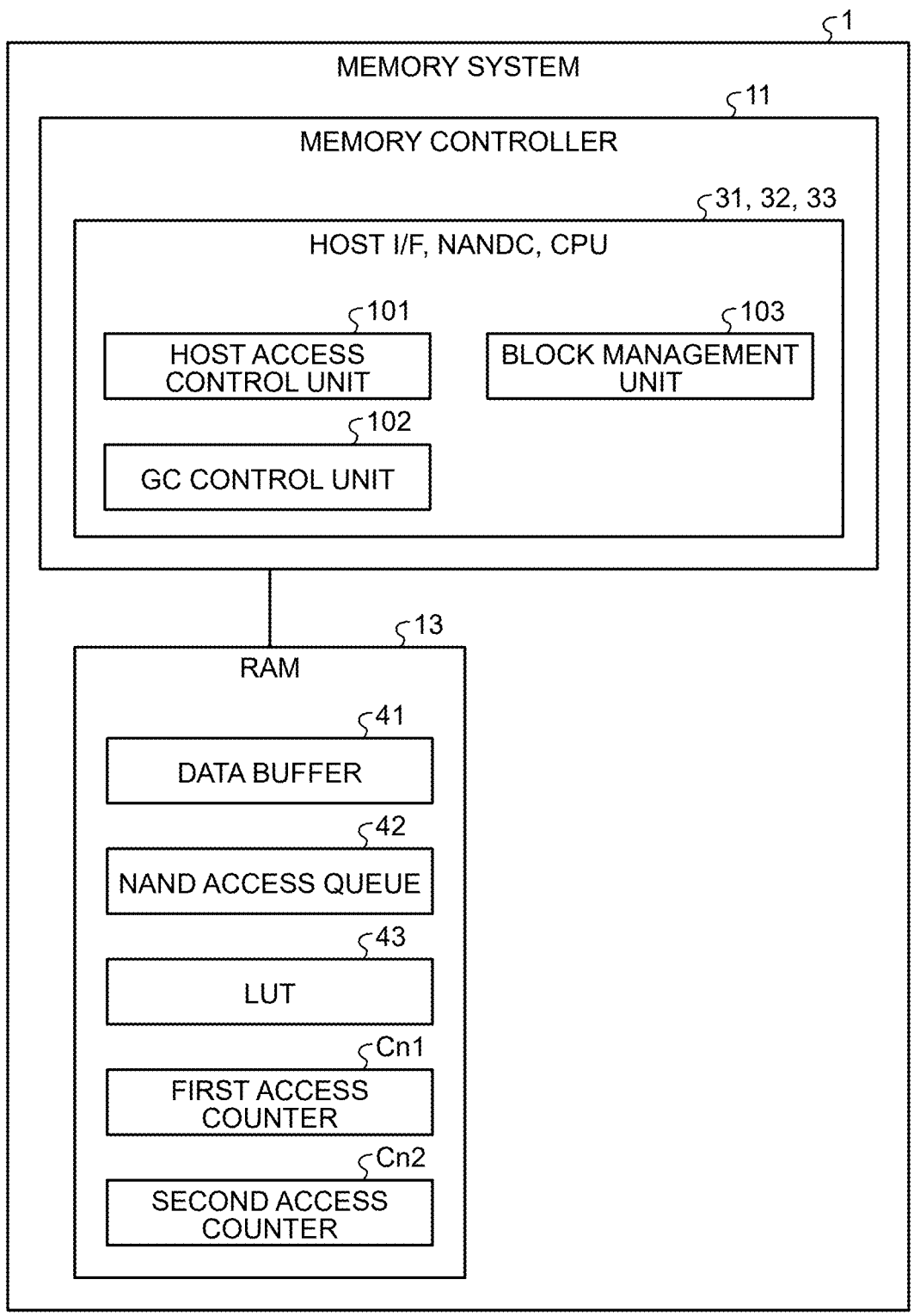
FIG. 6 is a schematic diagram illustrating an example of a functional configuration of the memory system according to the first embodiment.

FIG. 5 is a schematic diagram for illustrating a garbage collection operation, the third state, and the fourth state according to the first embodiment. FIG. 6 is a schematic diagram illustrating an example of a functional configuration of the memory system 1 according to the first embodiment.

The memory controller 11 functions as a host access control unit 101, a GC control unit 102, and a block management unit 103 by cooperation of some or all of the host I/F 31, the two NANDCs 32, and the CPU 33.

The RAM 13 includes a data buffer 41 and the NAND access queue 42. In addition, the RAM 13 stores a lookup table (LUT) 43, a first access counter Cn1, and a second access counter Cn2.

The LUT 43 is information in which a correspondence between a logical address and a physical address is recorded.

The NAND access queue 42 is a queue that stores access operation requests to the NAND memory 12. Among requests stored in the NAND access queue 42, a request for a read operation is denoted as a read request.

The host access control unit 101 generates a request for the NAND memory 12 in response to an access command from the host 2, and stores the generated request in the NAND access queue 42. The host access control unit 101 then executes an access operation to the NAND memory 12 in accordance with the request stored in the NAND access queue 42.

Note that, when two or more requests are stored in the NAND access queue 42, the order of processing of the two or more requests may be the same as or different from the order in which the requests are stored in the NAND access queue 42.

In FIG. 5, a dotted arrow indicates the presence of a read operation scheduled for a block BLK. The solid-hatch portion indicates an area storing valid data. A dot-hatch portion indicates an area storing invalid data. An outlined portion indicates an area where data is not stored, namely, an area from which data has been erased by the erase operation. The parallel-hatch portion indicates an area where the scheduled read operation is uncompleted.

In the garbage collection operation, the memory controller 11 copies valid data stored in one or more blocks BLK in the second state (for example, blocks BLKp to BLKr in FIG. 5) to a block BLK in the first state (for example, a block BLKt in FIG. 5). A block BLK as a copy source is denoted as a GC source block BLK or simply as a GC source. A block BLK as a copy destination is denoted as a GC destination block BLK or simply as a GC destination.

When having completed the copying of the valid data, the memory controller 11 manages the data in the GC destination block BLK, copied from the GC source block BLK, as valid data, and invalidates the data for which the copying in the GC source block BLK has been completed. With this operation, the GC source block BLK has no valid data.

By the timing of completion of the garbage collection operation, a request of a read operation for the GC source block BLK may be generated by the host access control unit 101. Among the blocks BLK for which the garbage collection operation has completed, a block BLK (for example, the blocks BLKq and BLKr in FIG. 5) for which it has not been confirmed to have no uncompleted read operation by one or more of the generated read requests is managed as a block in the third state. Among the blocks BLK for which the garbage collection operation has completed, a block BLK (for example, the block BLKp in FIG. 5) for which it is confirmed that there is no uncompleted read operation by the generated read requests is managed as a block in the fourth state.

In this manner, even when the garbage collection operation is completed, if there remains an uncompleted read operation for a GC source block BLK, the memory controller 11 cannot execute the erase operation for the GC source block BLK. Therefore, the memory controller 11 needs to check whether there is a remaining uncompleted read operation for the GC source block BLK.

Here, a technique to be compared with the first embodiment will be described. The technique to be compared with the first embodiment is denoted as a comparative example.

According to the comparative example, the memory controller includes, for each of the blocks, a counter (denoted as an access counter) that counts uncompleted read operations on a block. The memory controller includes the same number of access counters as the number of blocks included in the NAND memory. A group of these access counters is stored in the volatile memory and are updated and referenced on the volatile memory.

In recent years, the number of blocks included in a memory system is very large. Accordingly, in the case of the comparative example, the total size of the group of access counters is very large. When a group of access counters is arranged in a volatile memory capable of high-speed operation such as an SRAM, for example, the SRAM needs to have a large capacity, which would increase the cost of the memory system. In addition, for example, when a group of access counters is arranged in a relatively inexpensive volatile memory such as a DRAM, since access to the DRAM is slower than the SRAM or the like, the performance of the memory system would be degraded.

In the first embodiment, the memory controller 11 manages two access counters (a first access counter Cn1 and a second access counter Cn2). The memory controller 11 sets a plurality of non-overlapping and continuous time sections, and counts the number of uncompleted read operations among the read operations onto the NAND memory 12 generated in each of the two continuous time sections by using mutually different access counters among the access counters Cn1 and Cn2. The memory controller 11 switches the access counter, which counts the number of uncompleted read operations among the read operations corresponding to a read request generated by the host access control unit 101 in each time section, between the access counters Cn1 and Cn2. The memory controller 11 uses these two access counters Cn1 and Cn2 to check whether there is a remaining uncompleted read operation for a GC source block BLK. Since the number of required access counters is two, it is possible to significantly suppress an increase in the capacity of the volatile memory necessary to store the access counters as compared with the comparative example. Details of a method of checking whether there is a remaining uncompleted read operation using the two access counters Cn1 and Cn2 will be described below.

Returning to the description of FIG. 6. The GC control unit 102 controls a garbage collection operation. Specifically, the GC control unit 102 selects a GC source block BLK and a GC destination block BLK, copies valid data from the GC source block BLK to the GC destination block BLK, invalidates the original data in the GC source block BLK, and validates the copied data in the GC destination block BLK.

The block management unit 103 manages the state of each block BLK included in the NAND memory 12.

In particular, based on the first access counter Cn1 and the second access counter Cn2, the block management unit 103 performs transition from the third state to the fourth state with respect to a GC source block BLK for which the garbage collection operation has been completed.

In addition, the block management unit 103 transmits an erase command to the memory chip CP including a block BLK in the fourth state so as to cause the peripheral circuit 210 included in the memory chip CP to execute an erase operation on the block BLK in the fourth state. With this operation, the block management unit 103 causes the block BLK to transition from the fourth state to the first state.

Next, operations of the memory system 1 will be described.

Figure 7:
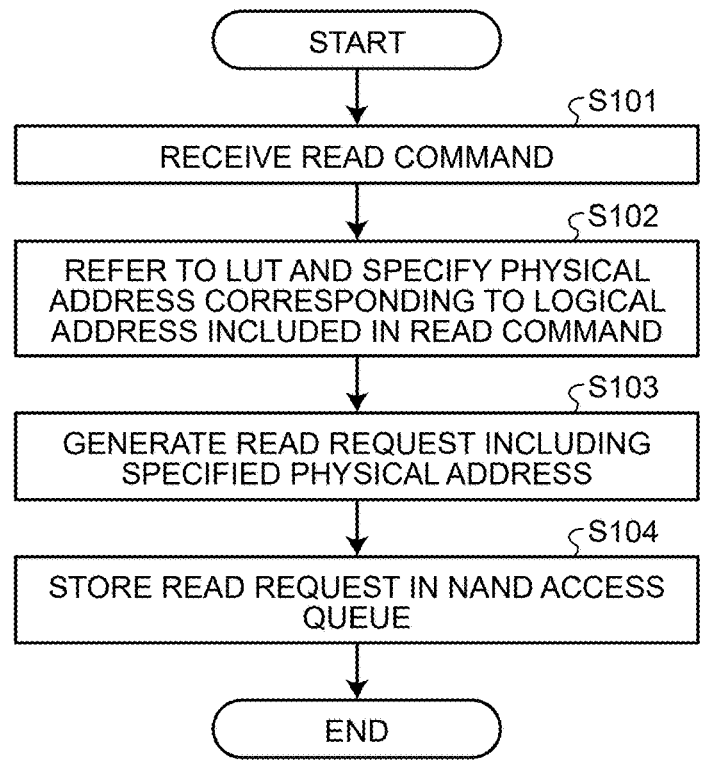
FIG. 7 is a flowchart illustrating an example of an operation of the memory system according to the first embodiment when a read command is received.

FIG. 7 is a flowchart illustrating an example of an operation of the memory system 1 according to the first embodiment when a read command is received.

Upon receiving, by the memory system 1, the read command from the host 2 (S101), the host access control unit 101 determines a physical address corresponding to the logical address included in the read command (S102) by referring to the LUT 43.

The host access control unit 101 generates a read request including the determined physical address (S103), and stores the generated read request in the NAND access queue 42 (S104). This completes the operation at the time of receiving the read request.

The host access control unit 101 executes the operations of steps S102 to S104 every time a read command is received from the host 2.

Figure 8:
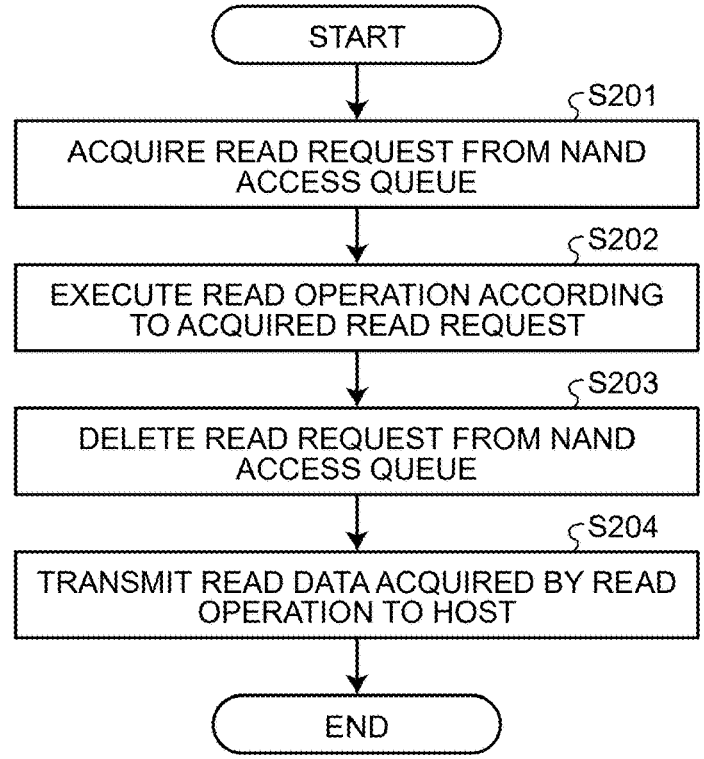
FIG. 8 is a flowchart illustrating an example of a series of operations related to a read operation onto NAND memory of the memory system according to the first embodiment.

FIG. 8 is a flowchart illustrating an example of a series of operations related to a read operation onto NAND memory 12 of the memory system 1 according to the first embodiment.

The host access control unit 101 monitors the NAND access queue 42. When an unprocessed read request is stored in the NAND access queue 42, the host access control unit 101 acquires the read request from the NAND access queue 42 (S201).

The host access control unit 101 executes a read operation in accordance with the acquired read request (S202). In step S202, the host access control unit 101 acquires the physical address included in the read request, and transmits a command instructing the data-out operation or the sense operation and the data-out operation to the memory chip CP including a location indicated by the acquired physical address. Having acquired read data from the memory chip CP by the data-out operation, the host access control unit 101 stores the read data in the data buffer 41 of the RAM 13.

Upon completing the read operation, the host access control unit 101 deletes the read request that has caused the execution of the read operation, namely, the read request acquired in step S201, from the NAND access queue 42 (S203).

The host access control unit 101 transmits the read data, which is acquired by the read operation and stored in the data buffer 41, to the host 2 in a timely manner (S204). This completes the series of operations related to the read operation.

The host access control unit 101 repeatedly executes the operations of steps S201 to S204 until there is no unprocessed read operation in the NAND access queue 42.

Figure 9:
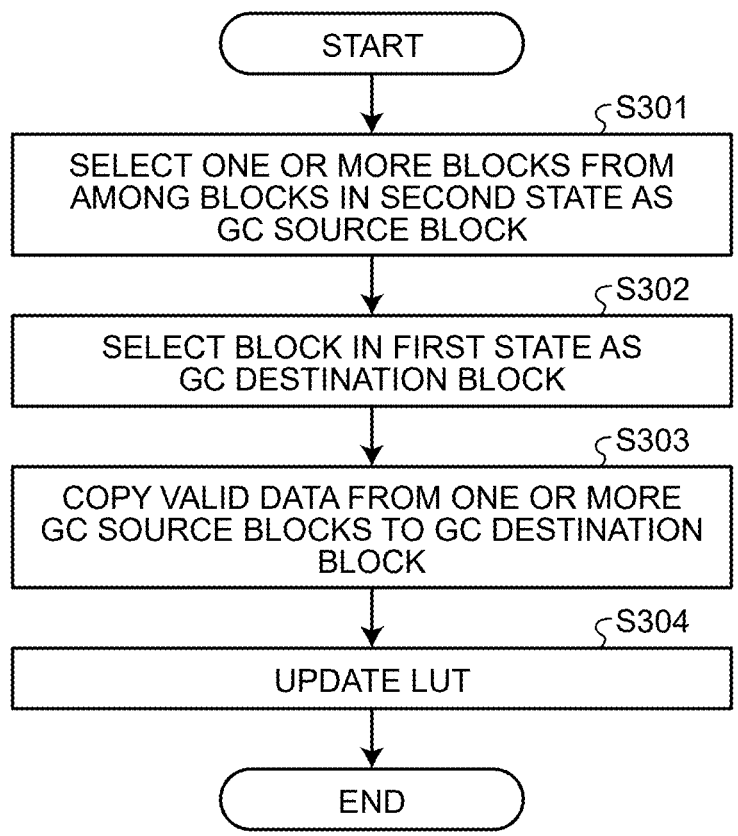
FIG. 9 is a flowchart illustrating an example of a garbage collection operation executed by the memory system according to the first embodiment.

FIG. 9 is a flowchart illustrating an example of a garbage collection operation executed by the memory system 1 according to the first embodiment.

The GC control unit 102 selects one or more blocks BLK from among the blocks BLK in the second state as a GC source block BLK (S301). In one example, the GC control unit 102 selects, as the GC source block BLK, a block BLK in which a relatively small amount of valid data is stored. Note that the method of selecting the GC source block BLK is not limited thereto.

The GC control unit 102 selects a block BLK in the first state as a GC destination block BLK (S302).

The GC control unit 102 copies valid data from one or more GC source blocks BLK to the GC destination block BLK (S303). The GC control unit 102 copies all valid data stored in the one or more GC source blocks BLK to the GC destination block BLK.

The GC control unit 102 updates the LUT 43 in response to the copy operation (S304). The GC control unit 102 changes the physical address corresponding to the logical address value indicating the location of the copied data from the physical address value indicating the storage location of the original data in the GC source block BLK to a physical address value indicating the storage location of the copied data in the GC destination block BLK. This invalidates all the data stored in the one or more GC source blocks BLK and validates the copied data in the GC destination block BLK.

With the completion of the processing in step S304, the garbage collection operation is completed.

As can be seen from FIG. 9, the valid data refers to data stored at a location associated with a logical address by the LUT 43. The invalid data refers to data stored in an area not associated with a logical address by the LUT 43. The valid data is data that is likely to be requested for reading by the host 2 later. The invalid data is data that is no longer likely to be requested for reading by the host 2.

After completion of the processing of step S304, the GC source block BLK is in a state not associated with a logical address, and thus, there will be no occurrence of new read requests for the GC source block BLK. However, generated read requests may include a read operation request for the GC source block BLK. In addition, even if the LUT 43 is updated by the processing in step S304, the physical address included in a generated read request is not to be changed. Therefore, even when data scheduled to undergo a read operation is copied to the GC destination block BLK by the garbage collection operation and the original data in the GC source block BLK is invalidated, the host access control unit 101 reads the invalidated original data stored in the GC source block BLK in accordance with the generated read request, instead of the data copied to the GC destination block BLK. The host access control unit 101 then transmits the invalidated original data read from the GC source block BLK to the host 2 in a timely manner.

For a block BLK in which all the stored data has been invalidated by the garbage collection operation, the block management unit 103 executes the control of the transition from the third state to the fourth state and the control of the erase operation by using the two access counters Cn1 and Cn2.

Figure 10:
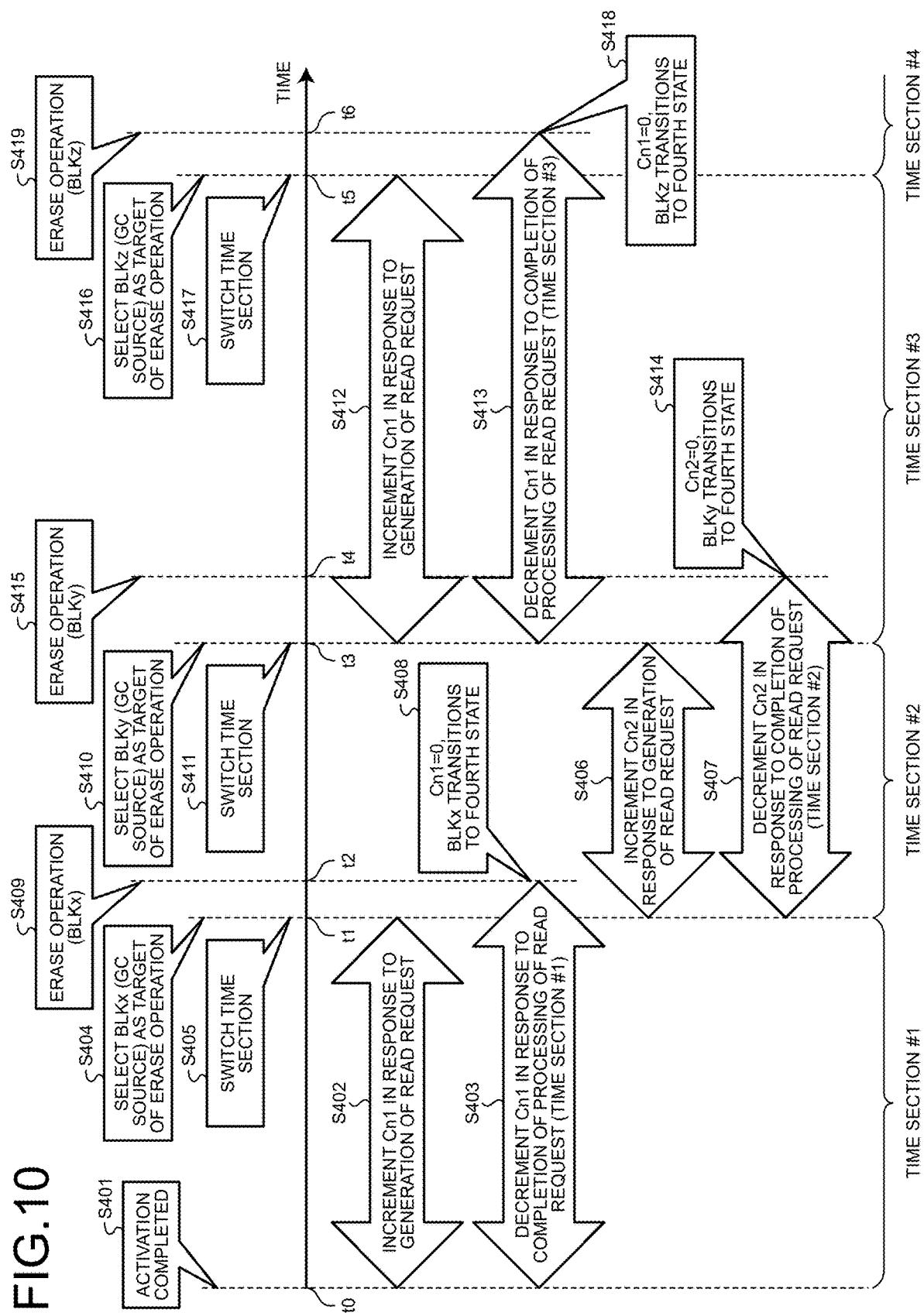
FIG. 10 is a diagram for illustrating an example of an operation of a block management unit according to the first embodiment.

FIG. 10 is a diagram for illustrating an example of an operation of the block management unit 103 according to the first embodiment. In the description regarding this drawing, it is assumed that initial values of count values of the access counters Cn1 and Cn2 are each 0 (zero).

When the activation of the memory system 1 is completed (S401), the block management unit 103 recognizes that the time section #1 starts at a timing (time t0) at which the activation is completed. Then, the block management unit 103 starts counting the number of uncompleted read operations in the time section #1 by using one (here, the first access counter Cn1) of the access counters Cn1 and Cn2.

The block management unit 103 sets a plurality of non-overlapping and continuous time sections in order from the time section #1. The block management unit 103 can increment only either one of the access counters Cn1 and Cn2 in each of the time sections, and can decrement both the access counters Cn1 and Cn2 regardless of the time section. The block management unit 103 alternately selects access counters to be incremented out of the access counters Cn1 and Cn2 with the lapse of each time section. Here, the block management unit 103 increments the first access counter Cn1 in the time section #1. Hereinafter, the access counter incremented in the time section #X may be denoted as an access counter corresponding to the time section #X.

In the time section #1, the block management unit 103 increments the first access counter Cn1 in response to the generation of a read request by the host access control unit 101 (S402). Note that the host access control unit 101 may store information (also referred to as first identification information) for identifying the access counter corresponding to each read request in, for example, the NAND access queue 42.

In response to the completion of the processing of a read request generated in the time section #1, the block management unit 103 decrements the first access counter Cn1 (S403). For example, the block management unit 103 decrements the first access counter Cn1 in response to the completion of the data-out operation requested to be executed by a read request generated in the time section #1. The block management unit 103 may determine the access counter to be decremented, by referring to the first identification information.

Note that the decrement of the first access counter Cn1 can be performed even after the time section #1. In a case where a read request generated in the time section #1 is processed in the time section #2 subsequent to the time section #1, the block management unit 103 decrements the first access counter Cn1 in the time section #2 in response to the completion of the processing of the read request.

On and after time t0, the GC control unit 102 repeatedly executes the garbage collection operation. The block management unit 103 selects a block BLK (denoted as a block BLKx) that has entered the third state by a garbage collection operation as a target of the erase operation (S404). Note that the block management unit 103 may store information (also referred to as second identification information) for identifying the access counter corresponding to each block BLK in the RAM 13, for example.

Note that the trigger condition for the operation of selecting the target of the erase operation is not limited to a specific condition. For example, the block management unit 103 may execute the processing of step S404 in response to a transition of a block BLK from the first state to the second state. Alternatively, the block management unit 103 may execute the processing of step S404 in response to the moment when the number of blocks BLK in the fourth state becomes smaller than a predetermined number.

At a timing (time t1) when the processing of step S404 is executed, the block management unit 103 switches the time section (S405). The block management unit 103 switches the setting of the time section from the time section #1 to the time section #2. In other words, the block management unit 103 switches, from the first access counter Cn1 to the second access counter Cn2, an access counter to be incremented in response to the occurrence of a read request.

In the time section #2, the block management unit 103 increments the second access counter Cn2 in response to the generation of a read request by the host access control unit 101 (S406). In response to the completion of the processing of a read request generated in the time section #2, the block management unit 103 decrements the second access counter Cn2 (S407).

The decrement of the second access counter Cn2 can be performed even after the time section #2. In a case where a read request generated in the time section #2 is processed in the time section #3 subsequent to the time section #2, the block management unit 103 decrements the second access counter Cn2 in the time section #3 in response to the completion of the processing of the read request.

At a timing (time t2) after the time t1, the count value of the first access counter Cn1 becomes 0 (zero). At this timing, the block management unit 103 causes the block BLKx to transition from the third state to the fourth state (S408). The block management unit 103 may determine an access counter to be checked by referring to the second identification information in order to implement transition of the block BLKx from the third state to the fourth state.

The count value 0 (zero) of the first access counter Cn1 means that processing of all read requests generated by the time t1 has been completed. At this timing, all the data stored in the block BLKx has been invalidated by the garbage collection operation. Therefore, after the completion of the garbage collection operation, there is no generation of new read operation request for the block BLKx. In other words, count value 0 of the first access counter Cn1 ensures that there is no uncompleted read operation for the block BLKx. Accordingly, as the count value of the first access counter Cn1 becomes 0 (zero), the block management unit 103 recognizes that the block BLKx is now in the fourth state, which is the erasable state.

The block management unit 103 can execute the erase operation at any time on the block BLKx in the fourth state. Here, as an example, the block management unit 103 executes the erase operation on the block BLKx at time t2 (S409). The erase operation causes the block BLKx to transition from the fourth state to the first state.

At time t2, the use of the first access counter Cn1 by the block management unit 103 is finished, and the first access counter Cn1 becomes available.

Similarly to the processing in step S404, the block management unit 103 selects a block BLK (denoted as a block BLKy) that has entered the third state by a garbage collection operation executed during the time section #2 or before the time section #2 as a target of the erase operation (S410).

At a timing (time t3) when the processing of step S410 is executed, the block management unit 103 switches the time section (S411). The block management unit 103 switches the setting of the time section from the time section #2 to the time section #3. The block management unit 103 switches an access counter to be incremented in response to the occurrence of a read request from the second access counter Cn2 to the first access counter Cn1.

In the time section #3, the block management unit 103 increments the first access counter Cn1 in response to the generation of a read request by the host access control unit 101 (S412). In response to the completion of the processing of the read request generated in the time section #3, the block management unit 103 decrements the first access counter Cn1 (S413).

The decrement of the first access counter Cn1 can be performed even after the time section #3. In a case where a read request generated in the time section #3 is processed in the time section #4 subsequent to the time section #3, the block management unit 103 decrements the first access counter Cn1 in the time section #4 in response to the completion of the processing of the read request.

At a timing (time t4) after the time t3, the count value of the second access counter Cn2 becomes 0 (zero). At this timing, similarly to the processing in step S408, the block management unit 103 causes the block BLKy to transition from the third state to the fourth state (S414). In short, the block BLKy is in an erasable state.

The block management unit 103 can execute the erase operation at any time on the block BLKy in the fourth state. Here, as an example, the block management unit 103 executes the erase operation on the block BLKy at time t4 (S415). The erase operation causes the block BLKy to transition from the fourth state to the first state.

At time t4, the block management unit 103 finishes using the second access counter Cn2.

Similarly to the processing in steps S404 and S410, the block management unit 103 selects a block BLK (denoted as a block BLKz) that has entered the third state by a garbage collection operation executed during the time section #3 or before the time section #3 as a target of the erase operation (S416).

At a timing (time t5) when the processing of step S416 is executed, the block management unit 103 switches the time section (S417). The block management unit 103 switches the setting of the time section from the time section #3 to the time section #4. The block management unit 103 switches an access counter to be incremented in response to with the occurrence of a read request from the first access counter Cn1 to the second access counter Cn2.

At a timing (time t6) after the time t5, the count value of the first access counter Cn1 becomes 0 (zero). At this timing, similarly to the processing in steps S408 and S414, the block management unit 103 causes the block BLKz to transition from the third state to the fourth state (S418). In short, the block BLKz is in an erasable state.

The block management unit 103 can execute the erase operation at any time on the block BLKz in the fourth state. Here, as an example, the block management unit 103 executes the erase operation on the block BLKz at time t6 (S419). The erase operation causes the block BLKz to transition from the fourth state to the first state.

In the above-described manner, the block management unit 103 performs the following operation in each time section. The block management unit 103 counts the number (denoted as a target number) of uncompleted requests for read operations, among the requests for read operations onto the NAND memory 12 generated in one time section (denoted as a target time section). The block management unit 103 executes the erase operation for a block BLK that has entered the third state by a garbage collection operation executed during the target time section or before the target time section, the erase operation being executed after the target number becomes 0 (zero) after the completion of the garbage collection operation.

For the operation described above, the block management unit 103 counts the target number using one of the two access counters Cn1 and Cn2. The block management unit 103 alternately uses the two access counters Cn1 and Cn2 with the lapse of the time section.

Figure 11:
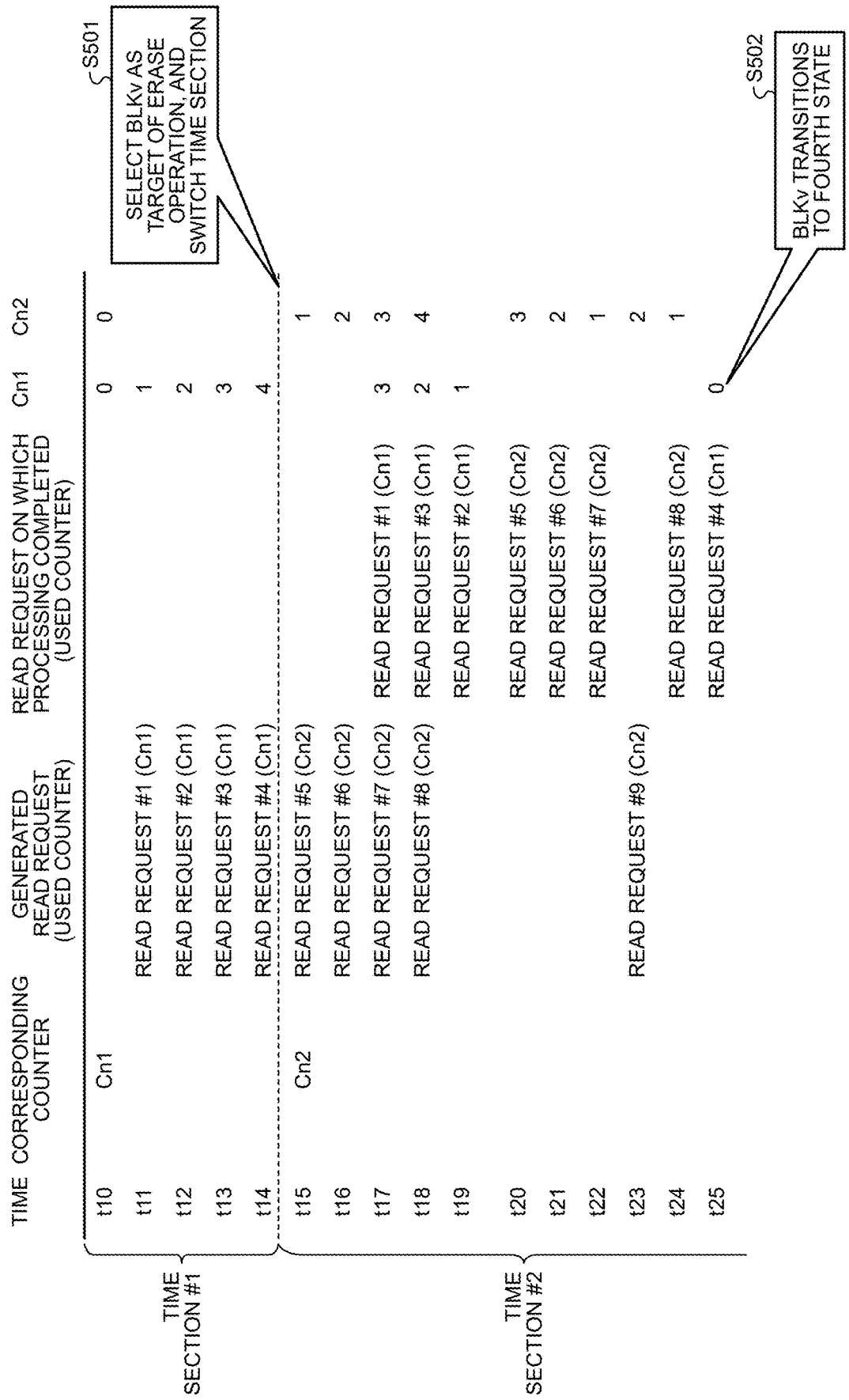
FIG. 11 is a diagram for illustrating a specific example of the operation of the block management unit according to the first embodiment.

FIG. 11 is a diagram for illustrating a specific example of the operation of the block management unit 103 according to the first embodiment.

In the example illustrated in FIG. 11, the time section #1 starts at time t10. At time t10, the count values of the access counters Cn1 and Cn2 are 0. The access counter corresponding to the time section #1 is the first access counter Cn1.

A read request #1 is generated at time t11, a read request #2 is generated at time t12, a read request #3 is generated at time t13, and a read request #4 is generated at time t14. The first access counter Cn1 is incremented in response to the generation of these read requests, and the count value of the first access counter Cn1 becomes 4 at time t14.

At time t14, the block management unit 103 selects a block BLK (denoted as block BLKv) in the third state as a target of erase operation, and switches the time section (S501). This processing corresponds to the processing of steps S404 and S405 illustrated in FIG. 10.

Subsequently, a read request #5 is generated at time t15, a read request #6 is generated at time t16, a read request #7 is generated at time t17, and a read request #8 is generated at time t18. After time t15, the second access counter Cn2 is incremented in response to the generation of the read requests, and the count value of the second access counter Cn2 becomes 4 at time t18.

The processing of the read request #1 is completed at time t17, the processing of the read request #3 is completed at time t18, and the processing of the read request #2 is completed at time t19. The read request #1, the read request #3, and the read request #2 are read requests generated in the time section #1, and at the time of generating these read requests, the first access counter Cn1, which is an access counter corresponding to the time section #1, is incremented. Therefore, the first access counter Cn1 is decremented in response to the completion of the processing of the read request #1, the read request #3, and the read request #2, and the count value of the first access counter Cn1 becomes 1 at time t19.

The processing of the read request #5 is completed at time t20, the processing of the read request #6 is completed at time t21, and the processing of the read request #7 is completed at time t22. The read request #5, the read request #6, and the read request #7 are read requests generated in the time section #2, and at the time of generating these read requests, the second access counter Cn2, which is an access counter corresponding to the time section #2, is incremented. Therefore, the second access counter Cn2 is decremented in response to the completion of the processing of the read request #5, the read request #6, and the read request #7, and the count value of the second access counter Cn2 becomes 1 at time t22.

A read request #9 is generated at time t23, the second access counter Cn2 is incremented accordingly, and the count value of the second access counter Cn2 becomes 2.

The processing of the read request #8 is completed at time t24, the second access counter Cn2 is decremented accordingly, and the count value of the second access counter Cn2 becomes 1.

The processing of the read request #4 is completed at time t25, the first access counter Cn1 is decremented accordingly, and the count value of the first access counter Cn1 becomes 0 (zero).

When the count value of the first access counter Cn1 becomes 0, the block management unit 103 recognizes that the block BLKv has transitioned from the third state to the fourth state (S502), enabling execution of the erase operation on the block BLKv.

Figure 12:
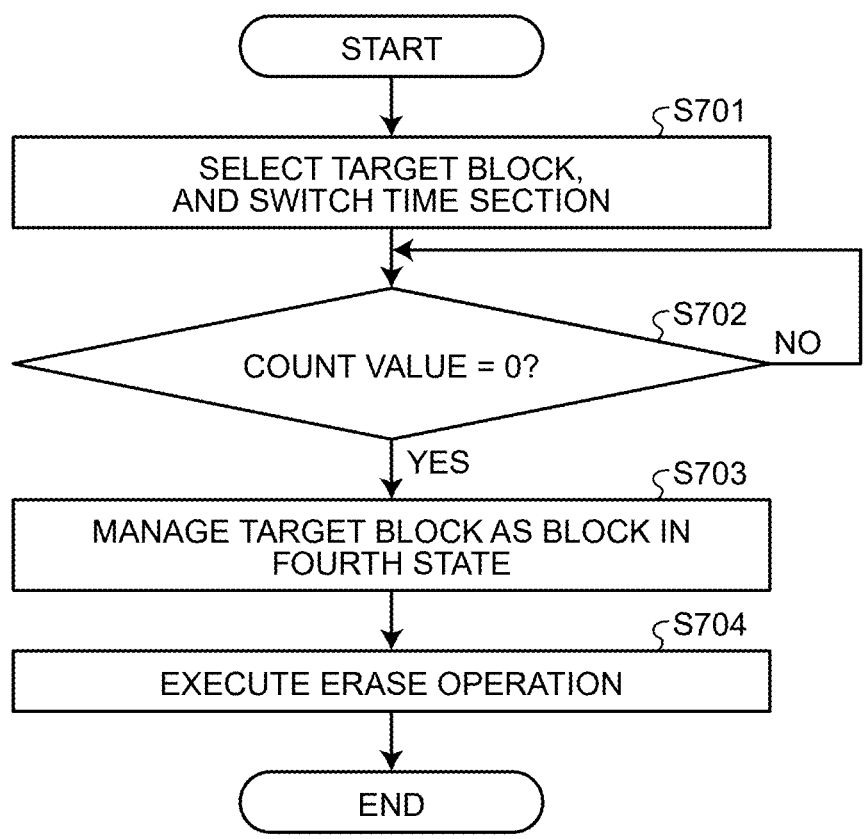
FIG. 12 is a flowchart illustrating an example of an erase operation executed by the memory system according to the first embodiment.

FIG. 12 is a flowchart illustrating an example of an erase operation by the memory system 1 according to the first embodiment.

At occurrence of a trigger condition of the operation of selecting an erase operation target block BLK (also referred to as a target block), the block management unit 103 selects the target block from the blocks BLK in the third state and switches the time section (S701).

The block management unit 103 checks whether the count value of the access counter corresponding to the target block is 0 or not (S702). In this case, the block management unit 103 may refer to the second identification information.

When the count value is not 0 (S702: No), the block management unit 103 waits until the count value becomes 0.

When the count value is or becomes 0 (S702: Yes), the block management unit 103 manages the target block as a block BLK in the fourth state (S703).

Thereafter, at an occurrence of the trigger condition of the erase operation, the block management unit 103 executes the erase operation on the block BLK managed as the fourth state (S704).

As described above, according to the first embodiment, the memory controller 11 has a configuration that the block management unit 103 counts the number (denoted as a first number) of uncompleted requests for read operations, among the requests for read operations onto the NAND memory 12 generated in a time section (denoted as a first time section). The block management unit 103 executes the erase operation for a block BLK that has entered the third state by a garbage collection operation executed during the first time section or before the first time section, the erase operation being executed after the first number becomes zero after the completion of the garbage collection operation.

The memory controller 11 is configured to count the number of uncompleted read operations in units of time sections. Therefore, the number of access counters can be significantly reduced as compared with the comparative example. This makes it possible to significantly suppress an increase in the capacity of a volatile memory (in the first embodiment, the RAM 13) necessary for management of the access counter.

According to the first embodiment, the number of access counters required is small, making it possible to provide the access counters (access counters Cn1 and Cn2) in a volatile memory capable of high-speed operation such as an SRAM while suppressing an increase in cost. Providing the access counters (access counters Cn1 and Cn2) in the volatile memory capable of high-speed operation will improve the performance of the memory system 1. Note that the access counters (access counters Cn1 and Cn2) may be provided in an inexpensive volatile memory such as a DRAM. Even in such a case, since the required capacity of the volatile memory is low, the cost of the memory system 1 can be reduced.

According to the first embodiment, the memory controller 11 switches the time section. In the memory controller 11, the block management unit 103 counts the number (denoted as a second number) of uncompleted requests for read operations, among the requests for read operations onto the NAND memory 12 generated in a time section (denoted as a second time section) subsequent to the first time section. The block management unit 103 executes the erase operation for a block BLK that has entered the third state by a garbage collection operation executed during the second time section or before the second time section, the erase operation being executed after the second number becomes 0 after the completion of the garbage collection operation.

In addition, according to the first embodiment, in the memory controller 11, the block management unit 103 counts the number of uncompleted requests for read operations by using the two access counters Cn1 and Cn2. Specifically, the two access counters Cn1 and Cn2 are stored in the RAM 13. In the memory controller 11, the block management unit 103 counts the number (denoted as a third number) of uncompleted requests for read operations, among the requests for read operations onto the NAND memory 12 generated in a time section (denoted as a third time section) subsequent to the second time section. The block management unit 103 executes the erase operation for a block BLK that has entered the third state by a garbage collection operation executed during the third time section or before the third time section, the erase operation being executed after the third number becomes 0 after the completion of the garbage collection operation. The block management unit 103 performs the counting of the first number and the counting of the third number by using one of the two access counters Cn1 and Cn2. The block management unit 103 counts the second number by using the other of the two access counters Cn1 and Cn2.

Therefore, providing only two access counters Cn1 and Cn2 in a volatile memory (the RAM 13 in the first embodiment), it is possible to control the transition from the third state to the fourth state for all the blocks BLK included in the NAND memory 12.

In the first embodiment, the two access counters Cn1 and Cn2 are alternately used. Note that the number of access counters provided in the RAM 13 is not limited to two. Three or more access counters may be provided in the RAM 13, and each of the three or more access counters may be used in order.

Second Embodiment

In the first embodiment, the block management unit 103 switches the time section at a timing when a block BLK in the third state is selected as the target of an erase operation. The trigger condition for switching the time section is not limited thereto. The second embodiment will describe, as another example of the trigger condition of the switching of the time section, a technology in which the switching of the time section is performed in response to the completion of the garbage collection operation. Hereinafter, contents different from those of the first embodiment will be described. The same contents as those of the first embodiment will be briefly described or omitted.

FIG. 13 is a diagram for illustrating a specific example of an operation of the block management unit 103 according to the second embodiment.

When the activation of the memory system 1 is completed (S601), the block management unit 103 recognizes that the time section #1 starts at a timing (time t30) at which the activation is completed. Then, the block management unit 103 starts counting the number of uncompleted read operations in the time section #1 by using one (here, the first access counter Cn1) of the access counters Cn1 and Cn2.

In the time section #1, the block management unit 103 increments the first access counter Cn1 in response to the generation of a read request by the host access control unit 101 (S602). In response to the completion of the processing of the read request generated in the time section #1, the block management unit 103 decrements the first access counter Cn1 (S603).

In the time section #1, the GC control unit 102 selects one or more blocks BLK (here, defined as blocks BLK1a, BLK2a, and BLK3a) as a GC source block BLK and executes the garbage collection operation (S604). Note that the GC control unit 102 may store information (also referred to as third identification information) for identifying an access counter corresponding to each GC source block BLK in the RAM 13, for example.

When the garbage collection operation in step S604 is completed (time t31), the blocks BLK1a, BLK2a, and BLK3a enter the third state. In step S605, the block management unit 103 executes switching of the time section in response to the completion of the garbage collection operation executed in step S604. The block management unit 103 switches the setting of the time section from the time section

1 to the time section #2, and switches an access counter to be incremented from the first access counter Cn1 to the second access counter Cn2.

In the time section #2, the block management unit 103 increments the second access counter Cn2 in response to the generation of a read request by the host access control unit 101 (S606). In response to the completion of the processing of the read request generated in the time section #2, the block management unit 103 decrements the second access counter Cn2 (S607).

In the time section #2, the GC control unit 102 selects one or more blocks BLK (here, defined as blocks BLK1b, BLK2b, and BLK3b) as a GC source block BLK and executes the garbage collection operation (S608).

At a timing (time t32) after the time t31, the count value of the first access counter Cn1 becomes 0 (zero). At this timing, the block management unit 103 causes the blocks BLK1a, BLK2a, and BLK3a to transition from the third state to the fourth state (S609). The block management unit 103 may determine an access counter to be checked by referring to the third identification information in order to implement transition of a block BLK from the third state to the fourth state.

The block management unit 103 can execute at any time the erase operation on the blocks BLK1a, BLK2a, and BLK3a in the fourth state. In one example, the block management unit 103 executes the erase operation on some or all of the blocks BLK1a, BLK2a, and BLK3a in response to the transition of a block BLK from the first state to the second state. Note that the trigger condition of the erase operation is not limited thereto.

When the garbage collection operation in step S608 is completed (time t33), the blocks BLK1b, BLK2b, and BLK3b enter the third state. In step S610, the block management unit 103 executes switching of the time section in response to the completion of the garbage collection operation executed in step S608. The block management unit 103 switches the setting of the time section from the time section #2 to the time section #3, and switches an access counter to be incremented from the second access counter Cn2 to the first access counter Cn1.

In the time section #3, the block management unit 103 increments the first access counter Cn1 in response to the generation of a read request by the host access control unit 101 (S611). In response to the completion of the processing of the read request generated in the time section #3, the block management unit 103 decrements the first access counter Cn1 (S612).

In the time section #3, the GC control unit 102 selects one or more blocks BLK (here, defined as blocks BLK1c, BLK2c, and BLK3c) as a GC source block BLK and executes the garbage collection operation (S613).

At a timing (time t34) after the time t33, the count value of the second access counter Cn2 becomes 0 (zero). At this timing, the block management unit 103 causes the blocks BLK1b, BLK2b, and BLK3b to transition from the third state to the fourth state (S614). Similarly to the blocks BLK1a, BLK2a, and BLK3a that have entered the fourth state, the block management unit 103 can execute the erase operation at any time on the blocks BLK1b, BLK2b, and BLK3b that have entered the fourth state.

When the garbage collection operation in step S613 is completed (time t35), the blocks BLK1c, BLK2c, and BLK3c enter the third state. In step S615, the block management unit 103 executes switching of the time section in response to the completion of the garbage collection operation executed in step S613. The block management unit 103 switches the setting of the time section from the time section #3 to the time section #4, and switches an access counter to be incremented from the first access counter Cn1 to the second access counter Cn2.

In the time section #4, the block management unit 103 increments the second access counter Cn2 in response to the generation of a read request by the host access control unit 101. In response to the completion of the processing of the read request generated in the time section #4, the block management unit 103 decrements the second access counter Cn2.

At a timing (time t36) after the time t35, the count value of the first access counter Cn1 becomes 0 (zero). At this timing, the block management unit 103 causes the blocks BLK1c, BLK2c, and BLK3c to transition from the third state to the fourth state (S616). Similarly to the blocks BLK1a, BLK2a, and BLK3a that have entered the fourth state, the block management unit 103 can execute the erase operation at any time on the blocks BLK1c, BLK2c, and BLK3c that have entered the fourth state.

In this manner, the block management unit 103 may execute the switching of the time section in response to the completion of the garbage collection operation.

In the first embodiment and the second embodiment, the number of uncompleted read requests is counted by each of the access counters Cn1 and Cn2 for the entire NAND memory 12. However, in each time section, the number of uncompleted read requests may be counted in units smaller than the NAND memory 12 and larger than a single block BLK.

For example, the access counters Cn1 and Cn2 may be provided for each memory chip CP. Alternatively, the access counters Cn1 and Cn2 may be provided for each memory package 20. Alternatively, the access counters Cn1 and Cn2 may be provided for each channel CH.

In this manner, the access counters Cn1 and Cn2 may be provided for each of the blocks BLK.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory system comprising:
a nonvolatile memory including a plurality of storage areas each being a unit of an erase operation; and
a memory controller configured to:
count a first number being the number of uncompleted requests generated in a first time section for read operations to be executed on one or more first storage areas of the plurality of storage areas;
count a second number being the number of uncompleted requests generated in a second time section subsequent to the first time section for read operations to be executed on one or more second storage areas of the plurality of storage areas; and
in the second time section, wait until the first number becomes zero without executing the erase operation on any of the first storage areas while the first number is not zero, and execute the erase operation on at least one of the first storage areas in response to the first number becoming zero.

2. The memory system according to claim 1, further comprising a volatile memory, wherein
the memory controller is further configured to:
store a first counter and a second counter in the volatile memory;
count a third number being the number of uncompleted requests generated in a third time section subsequent to the second time section for read operations to be executed on one or more third storage areas of the plurality of storage areas;
execute the counting of the first number and the counting of the third number by using the first counter; and
execute the counting of the second number by using the second counter.

3. The memory system according to claim 1, wherein the memory controller is further configured to switch a time section from the first time section to the second time section in response to determining, in the first time section, at least one of the first storage areas as an execution target of the erase operation.

4. The memory system according to claim 1, wherein the memory controller is further configured to:
execute, in the first time section, a garbage collection operation using at least one of the first storage areas as a copy source, and
switch a time section from the first time section to the second time section in response to completion of the garbage collection operation.

5. The memory system according to claim 1, wherein the memory controller is further configured to:
in response to receiving a read command including first address information from a host, acquire second address information indicating a location in the nonvolatile memory corresponding to the first address information, the first address information indicating a location in an address space provided by the memory controller to the host;
store, in a queue, a request for a read operation including the second address information; and
read data stored in the location indicated by the second address information in accordance with the request stored in the queue, the data being read regardless of whether the data is valid or invalid.

6. The memory system according to claim 1, wherein the memory controller is further configured to:
in the first time section, invalidate data stored in one of the first storage areas; and
in response to receiving a read command from a host, read, in the second time section, the invalidated data stored in the one of the first storage areas and transmit the invalidated data read from the one of the first storage areas to the host.

7. The memory system according to claim 1, wherein the memory controller is configured to:
increment the first number upon generating, in the first time section, a request for a read operation to be executed on at least one of the first storage areas; and
decrement the first number upon the requested read operation being finished.

8. The memory system according to claim 1, wherein the memory controller is further configured to, in accordance with the first number, manage a state of each of the first storage areas as a first state or a second state, the first state being a state in which the corresponding first storage area stores no valid data and the erase operation thereto is prohibited, the second state being a state in which the corresponding first storage area stores no valid data and the erase operation thereto is enabled.

9. The memory system according to claim 1, wherein the memory controller is further configured to manage first information indicating whether the first number or the second number is counted for each of the generated requests for read operations.

10. The memory system according to claim 1, wherein the memory controller is further configured to manage second information indicating whether the first number or the second number is to be referred to determining the execution of the erase operation for each of the plurality of storage areas.

11. A method of controlling a nonvolatile memory, the nonvolatile memory including a plurality of storage areas each being a unit of an erase operation, the method comprising:
counting a first number being the number of uncompleted requests generated in a first time section for read operations to be executed on one or more first storage areas of the plurality of storage areas;
counting a second number being the number of uncompleted requests generated in a second time section subsequent to the first time section for read operations to be executed on one or more second storage areas of the plurality of storage areas; and
in the second time section, waiting until the first number becomes zero without executing the erase operation on any of the first storage areas while the first number is not zero, and executing the erase operation on at least one of the first storage areas in response to the first number becoming zero.

12. The method according to claim 11, further comprising:
storing a first counter and a second counter in a volatile memory; and
counting a third number being the number of uncompleted requests generated in a third time section subsequent to the second time section for read operations to be executed on one or more third storage areas of the plurality of storage areas, wherein
the counting of the first number and the counting of the third number are executed by using the first counter, and
the counting of the second number is executed by using the second counter.

13. The method according to claim 11, further comprising:
switching a time section from the first time section to the second time section in response to determining, in the first time section, at least one of the first storage areas as an execution target of the erase operation.

14. The method according to claim 11, further comprising:
executing, in the first time section, a garbage collection operation using at least one of the first storage areas as a copy source, and
switching a time section from the first time section to the second time section in response to completion of the garbage collection operation.

15. The method according to claim 11, further comprising:
receiving a read command including first address information from a host;

in response to the read command, acquiring second address information indicating a location in the nonvolatile memory corresponding to the first address information, the first address information indicating a location in an address space provided to the host;

storing, in a queue, a request for a read operation including the second address information; and reading data stored in the location indicated by the second address information in accordance with the request stored in the queue, the data being read regardless of whether the data is valid or invalid.

16. The method according to claim 11, further comprising:

in the first time section, invalidating data stored in one of the first storage areas;

receiving a read command from a host; and in response to the read command, reading, in the second time section, the invalidated data stored in the one of the first storage areas and transmitting the invalidated data read from the one of the first storage areas to the host.

17. The method according to claim 11, wherein
the first number is incremented upon generating, in the first time section, a request for a read operation to be executed on at least one of the first storage areas, and the first number is decremented upon the requested read operation being finished.

18. The method according to claim 11, further comprising:

in accordance with the first number, managing a state of each of the first storage areas as a first state or a second state, the first state being a state in which the corresponding first storage area stores no valid data and the erase operation thereto is prohibited, the second state being a state in which the corresponding first storage area stores no valid data and the erase operation thereto is enabled.

19. The method according to claim 11, further comprising:

managing first information indicating whether the first number or the second number is counted for each of the generated requests for read operations.

20. The method according to claim 11, further comprising:

managing second information indicating whether the first number or the second number is to be referred to determining the execution of the erase operation for each of the plurality of storage areas.

* * * * *